United States Patent [19]

Ohno et al.

[11] Patent Number: 5,555,010
[45] Date of Patent: Sep. 10, 1996

[54] REWRITABLE RECORDING APPARATUS

[75] Inventors: Tadayoshi Ohno; Takashi Yamaguchi; Shinichi Itoh, all of Kawasaki, Japan

[73] Assignee: Kabushiki Kaisha Toshiba, Kawasaki, Japan

[21] Appl. No.: 858,638

[22] Filed: Mar. 27, 1992

[30] Foreign Application Priority Data

Mar. 29, 1991 [JP] Japan .................................. 3-089008

[51] Int. Cl.$^6$ ................................................ B41J 2/325
[52] U.S. Cl. ................................................ 347/211
[58] Field of Search ............................ 346/76 PH, 76 R; 347/211, 171, 183; 400/120.01, 120.07

[56] References Cited

U.S. PATENT DOCUMENTS

| | | |
|---|---|---|
| 4,429,318 | 1/1984 | Kobata . |
| 4,540,295 | 9/1985 | Okunishi et al. . |
| 4,633,269 | 12/1986 | Mikami et al. . |
| 4,675,695 | 6/1987 | Samuel .................... 346/76 PH |
| 4,679,053 | 7/1987 | Katsurai et al. . |
| 4,695,528 | 9/1987 | Dabisch et al. . |
| 4,700,200 | 10/1987 | Hibino . |
| 4,806,950 | 2/1989 | Sekine et al. ............. 346/76 PH |
| 4,831,387 | 5/1989 | Sakaguchi et al. . |
| 4,839,731 | 6/1989 | Saka ........................ 358/296 |
| 4,851,924 | 7/1989 | Nakamura et al. ........ 358/296 |
| 4,933,686 | 6/1990 | Izumi et al. ............. 346/76 PH |
| 4,965,591 | 10/1990 | Kurabayashi et al. ...... 346/108 |
| 5,235,345 | 8/1993 | Ohno et al. .............. 346/76 PH |

FOREIGN PATENT DOCUMENTS

| | | |
|---|---|---|
| 0076892 | 4/1983 | European Pat. Off. . |
| 0147520 | 7/1985 | European Pat. Off. . |
| 0193342 | 9/1986 | European Pat. Off. . |
| 2-50897 | 2/1990 | Japan . |
| 2184693 | 7/1987 | United Kingdom . |
| 2184695 | 7/1990 | United Kingdom . |

*Primary Examiner*—Huan H. Tran
*Attorney, Agent, or Firm*—Cushman Darby & Cushman, L.L.P.

[57] ABSTRACT

A thermal recording medium is provided for recording dot thereon by an opaque state thereof when applied with thermal recording energy and for erasing dot therefrom by a transparent state when applied with thermal erasing energy. The thermal energy is supplied from a thermal head to the recording medium as multiple pulses in a one-dot forming period. Heat generated from the thermal head is controlled by an activation pulse computing section to gradually increase the recording energy and erasing energy to be applied to the recording medium to provide a gentle change in the temperature rise of the recording medium, thereby reducing the temperature change per unit time and ensuring finer control, thus accomplishing stable information recording and erasing.

2 Claims, 6 Drawing Sheets

REWRITABLE RECORDING APPARATUS

BACKGROUND OF THE INVENTION

1. Field of the Invention

The present invention relates to a recording apparatus which records a visual image on, or erases it from, a recording material which permits information to be formed thereon or erased therefrom by heat.

2. Description of the Related Art

In conventional hard copy recording, a developer, such as ink or toner, is externally applied to a recording medium like paper to form a visible image on the medium, or a visible image is formed on a thermal recording layer formed on a base material (e.g., paper) as in the case of thermal recording paper, providing a permanent image. As various network systems are built and facsimile and copying machines become popular, however, consumption of the recording medium and recording material such as thermal recording paper is significantly increased, causing environmental destruction, such as excessive deforestation, and social problems on waste disposal or the like. It is strongly demanded that the consumption of the recording materials should be reduced by means of recycling recording paper, etc. in order to cope with those problems.

To meet the demand, attention has been paid to recording materials which permit repetitive forming and erasing of a visible image thereon and therefrom. One recording material with that property has been proposed, whose transparent state and light-extinct or opaque state can reversibly be altered from one to the other by applied heat to form and erase a visible image (e.g., U.S. Pat. No. 4,695,528).

No established recording apparatus has appeared which can repetitively record information (form a visible image) on or erase it from the above-described recording material whose transparent and opaque states are reversibly changed from one to the other according to applied heat. There is a great demand for a recording apparatus which can easily control temperature for information recording and erasing and can ensure stable information recording and erasing.

SUMMARY OF THE INVENTION

It is therefore an object of the present invention to provide a recording apparatus which can easily control temperature for information recording and erasing and can ensure stable information recording and erasing, with respect to a recording material whose transparency and opaqueness can be reversibly altered from one to the other according to controlling its temperature.

To achieve the above object, a recording apparatus according to the present invention comprises thermal head means for selectively applying one of thermal recording energy and thermal erasing energy, for every recording dot or erasing dot, to a recording medium which permits visible image recording thereon when applied with the thermal recording energy and visible image erasing therefrom when applied with the thermal erasing energy; and control means for performing such control that a drive signal for operating the thermal head means to apply the thermal recording energy or the thermal erasing energy to the recording medium is continually supplied as multiple pulses in a one-dot forming period.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

A preferred embodiment of the present invention will now be described referring to the accompanying drawings.

Figure 1:
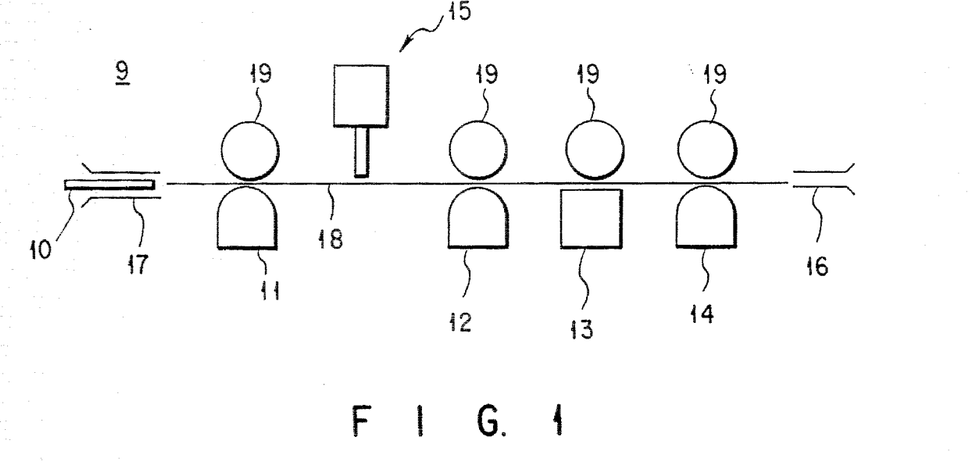
FIG. 1 is a diagram illustrating the structure of a card processing device according to one embodiment of the present invention.

FIG. 1 illustrates a recording apparatus according to one embodiment of the present invention as applied to a card processing device a which processes a prepaid card 10 (hereafter referred to simply as "card") prepared as a portable recording medium. The card processing device 9 performs magnetic recording and reproduction of information on and from the card 10, such as subtraction of necessary amount of money from the balance to obtain a new balance, and rewrites the balance with the new balance displayed as visible information using heat.

The card processing device 9 has a feeding path 18, extending from an input slot 17 to an output slot 16. Under the feeding path 18, a reading magnetic head 11, a writing magnetic head 12, thermal head recording means 13 and a reading magnetic head 14 are located in the named order from the side of the input slot 17. Above the feeding path 18, platen rollers 19 are provided in correspondence to the respective positions of the heads 11, 12 and 14 and the thermal head recording means 13. These platen rollers 19 serve as card feeding means (not shown in details).

A stopper 15 is provided movable between the reading magnetic head 11 and the writing magnetic head 12 to open or shut the feeding path 18.

Figure 2:
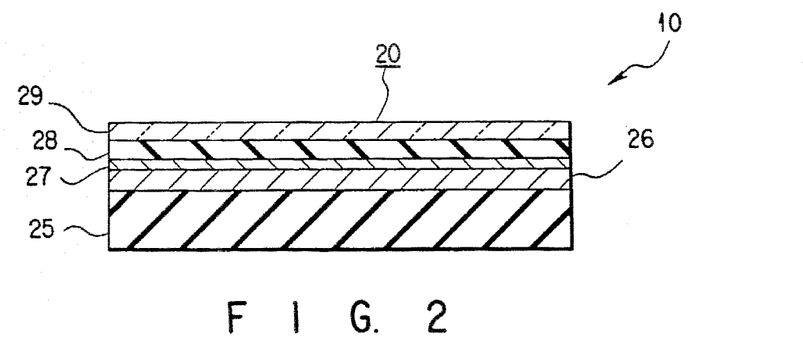
FIG. 2 is a cross section of one structural example of a card to be used in the card processing apparatus.

FIG. 2 illustrates an exemplary structure of the card 10 which is processed in the card processing device 9.

Part of the card 10 is a display portion 20 with a thermal recording layer 28 whose transparent state and opaque state are reversibly changed from one to the other according to the hysteresis temperature.

The card 10 having the above display portion 20 further comprises a magnetic recording layer 26, a shielding layer 27 for the magnetic recording layer 26, such as a metal thin film layer, the thermal recording layer 28 and a transparent protection layer 29 laminated in order on one surface of a base member 25.

Figure 3:
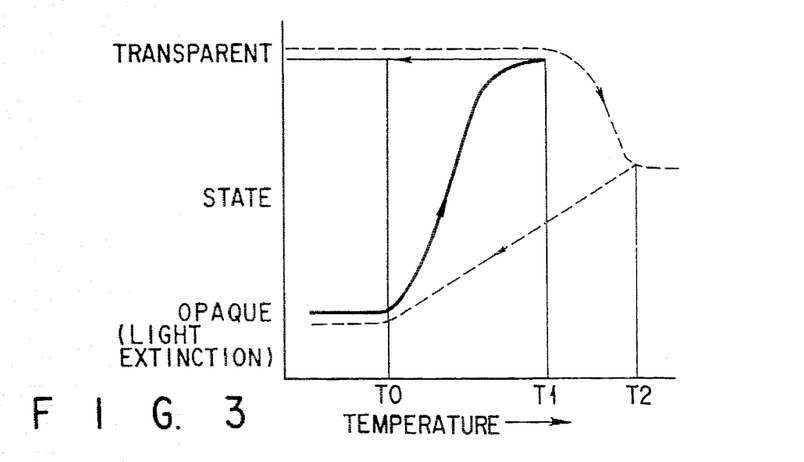
FIG. 3 is a diagram for explaining the relationship between the status of the recording layer of the card and temperature.

As shown in FIG. 3, when the temperature of the thermal recording layer 28 in an opaque state is changed from a normal or room temperature T0 to a first temperature T1, the opaque or light-extinct state of the thermal recording layer 28 is changed to the transparent state. The recording layer 28 is maintained in the transparent state even when the temperature T1 returns to the normal temperature T0. When the temperature of the recording layer 28 in the transparent state is changed from the normal temperature T0 to a second temperature T2 as shown by the dashed line, the state of the recording layer 28 is changed from transparent to opaque. The opaque state of the recording layer 28 is maintained even when the temperature T2 is lowered to the normal temperature T0 again.

The thermal recording layer 28 with such property is designed to have at least low molecular weight organic substance dispersed into high molecular matrix materials.

The matrix materials can be thermoplastic or duroplastic synthetic materials or natural or synthetic resins; they can harden into elastomers or rigid bodies to form recording layer 28.

The most varied classes of materials can be employed as matrix materials, special selection being determined on one hand according to the refractive index and on the other hand according to the physical properties required for a special purpose of application. They should be as mechanically stable and as film-forming as possible. Examples of suitable matrix materials are polyesters, polyamides, polystyrol, polyacrylates, and polymethacrylates as well as silicon resins. Of the polyesters, the high-molecular linear saturated polyesters, especially those with molecular weights of 10,000 to 20,000, are particularly suitable. Especially serviceable as matrix material are vinylidene chloride copolymers, such as polyvinylidene chloride-acrylic nitrile-copolymers, polyvinyl chloride, vinyl cholride copolymers, vinyl acetate copolymers, and vinyl chloride-vinyl acetate copolymers and/or polyesters. Special examples of matrix materials are polymers of 91% by weight of vinyl chloride, 3% by weight of vinyl acetate, and 6% by weight of vinyl alcohol; 83% by weight of vinyl chloride, 16% by weight of vinyl acetate; and 1% by weight of maleic acid; or 90% by weight of vinyl chloride, 5% by weight of polyvinyl acetate, and 5% by weight of vinyl alcohol; vinyl chloride-acrylate copolymers; terpolymerisates with free carboxyl groups; and polymers of 83% by weight of vinyl chloride, 16% by weight of vinyl acetate; and 1% by weight of dicarboxylic acid. Commercial names of such polymers are vinylite VAGH, VMCC, and VROH (Union Carbide), Vinnol E 5/48A and H 15/45M (Wacker-Chemie), and Vilit MC39 (Chemische Werke Huls AG). Matrix materials (A) which show white fracture are more favorable to use.

It is favorable to keep the weight ratio of organic substance (B) to matrix material (A) within the range of 1:3 to 1:16, preferably 1:6 to 1:12, so that 3 to 16, preferably 6 to 12, parts by weight of matrix material form a part by weight of the organic substance (B). Particularly serviceable organic substances (B) are those with at least one hetero atom, especially oxygen, nitrogen, sulfur, and/or halogen, in the molecule.

Examples of suitable organic substances (B) are alkanoles; alkandioles; halogen alkanoles or halogen alkandioles; alkyl amines; alkanes; alkenes; alkines; halogen alkanes, halogen alkenses, or halogen alkines; cycloalkanes, alkense, and alkines; saturated or unsaturated mono- or di-carboxylic acids or esters, amides, or ammonium salts of the same, saturated or unsaturated halogen fatty acids or esters, amides, or ammonium salts of the same; acrylic carbonic acids or their esters, amides, or ammonium salts; halogen aryl carbonic acids or their esters, amides, or ammonium salts; thio alcohols; thio carbonic acids or their esters, amides, or ammonium salts; or carboxylic acid esters of thio alcohols, as well as mixtures of the same, all these compounds appropriately containing 10 to 60, preferable 10 to 38, especially 10 to 30, carbon atoms. In the esters, the alcohol groups for their part may be saturated or unsaturated and/or halogen substituted. In these compounds, the halogen atoms are, appropriately, chlorine or bromine, especially chlorine. Appropriately, the halogen compounds contain one or two halogen substituents. Such compounds as contain at least one straight-chain aliphatic group, appropriately with 10 to 30 carbon atoms, have proven to be particularly favorable as organic substance (B). In the acrylic groups, the aryl group is preferably phenyl or substituted phenyl.

Information is displayed (in the form of a visible image) on the display portion 20 by selectively rendering the recording layer 28 to the opaque state with the color of the shielding layer 27 as the base or background color. The displayed visible image is erased by rendering the opaque portions of the recording layer 28 to be transparent, exposing the base color of the shielding layer 27.

In processing this type of card 10, the card 10 is first loaded with the base member 25 facing up into the input slot 17. The card 10 is then carried on the feeding path 18 by the card feeding means such as an electric motor (not shown).

Information, such as authenticity data of the card 10 and card-history data, recorded on the magnetic recording layer 26 provided in the card 10 is read out by the reading magnetic head 11. Then, information concerning a new usage such as a result of a transaction is written on the magnetic recording layer 26 by the writing magnetic head 12.

Further, the thermal recording or erasing energy is applied to the display portion 20 of the card 10 by the thermal head recording means 13, effecting the formation or erasing of a visible image on or from the display portion 20. The formation or erasing of the visible image by the thermal head recording means 13 is executed based on that information in the information recorded on the magnetic recording layer 26 which can be viewed on the display portion 20.

Then, the information recorded on the magnetic recording layer 26 is read out by the reading magnetic head 14, and the card 10 is discharged after the contents of the recorded information are checked.

When the authenticity of the card 10, etc. is in question after the information is read at the reading magnetic head 11, the stopper 15 functions to stop feeding the card 10, the feeding path 18 is driven in the reverse direction thereby returning the card 10 through the input slot 17.

Figure 4:
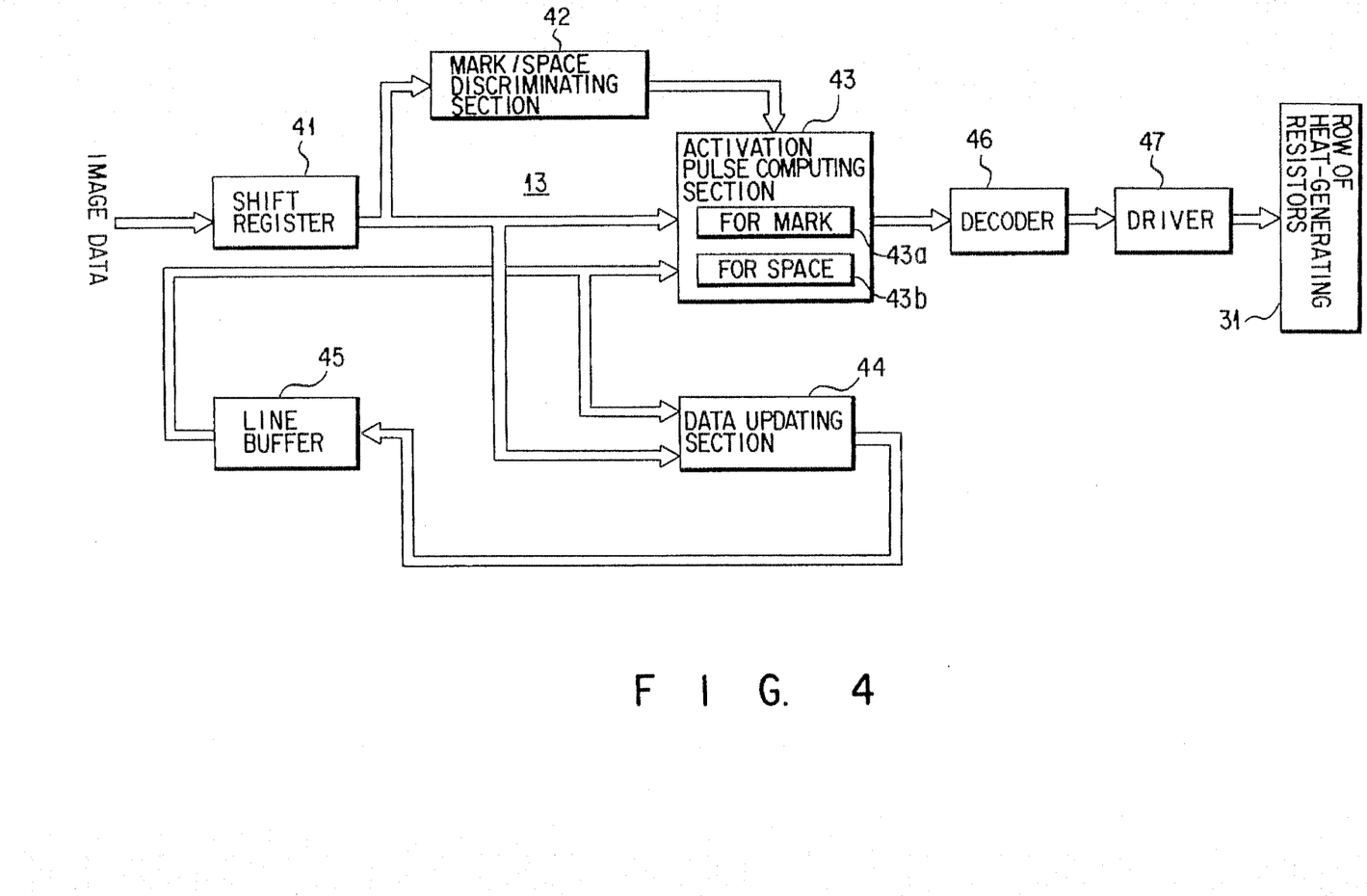
FIG. 4 is a block diagram showing an example of the structure of a thermal head recording means in the card processing device.

FIG. 4 exemplifies the structure of the thermal head recording means 13.

The thermal head recording means 13 mainly comprises a shift register 41, a mark/space discriminating section 42, an activation pulse computing section 43 as control means, a decoder 46, a driver 47 as a thermal head driver, and an array of heat-generating resistors (thermal head) 31 as the thermal head means. This thermal head recording means 13 is also provided with a data updating section 44 and a line buffer 45, which constitute an activation pulse data computing circuit (to be described later). The data updating section 44 and line buffer 45 are used to estimate accumulated heat energy to the heat-generating resistor corresponding to a target pixel which is the target for information recording or erasing.

The shift register 41 receives image data from an external data source (not shown) as information to be displayed on the display portion 20 of the card 10.

The mark/space discriminating section 42 discriminates whether the target pixel for information recording or erasing is a recording pixel (opaque or mark dot) or an erasing pixel (transparent or space dot).

Figure 5:
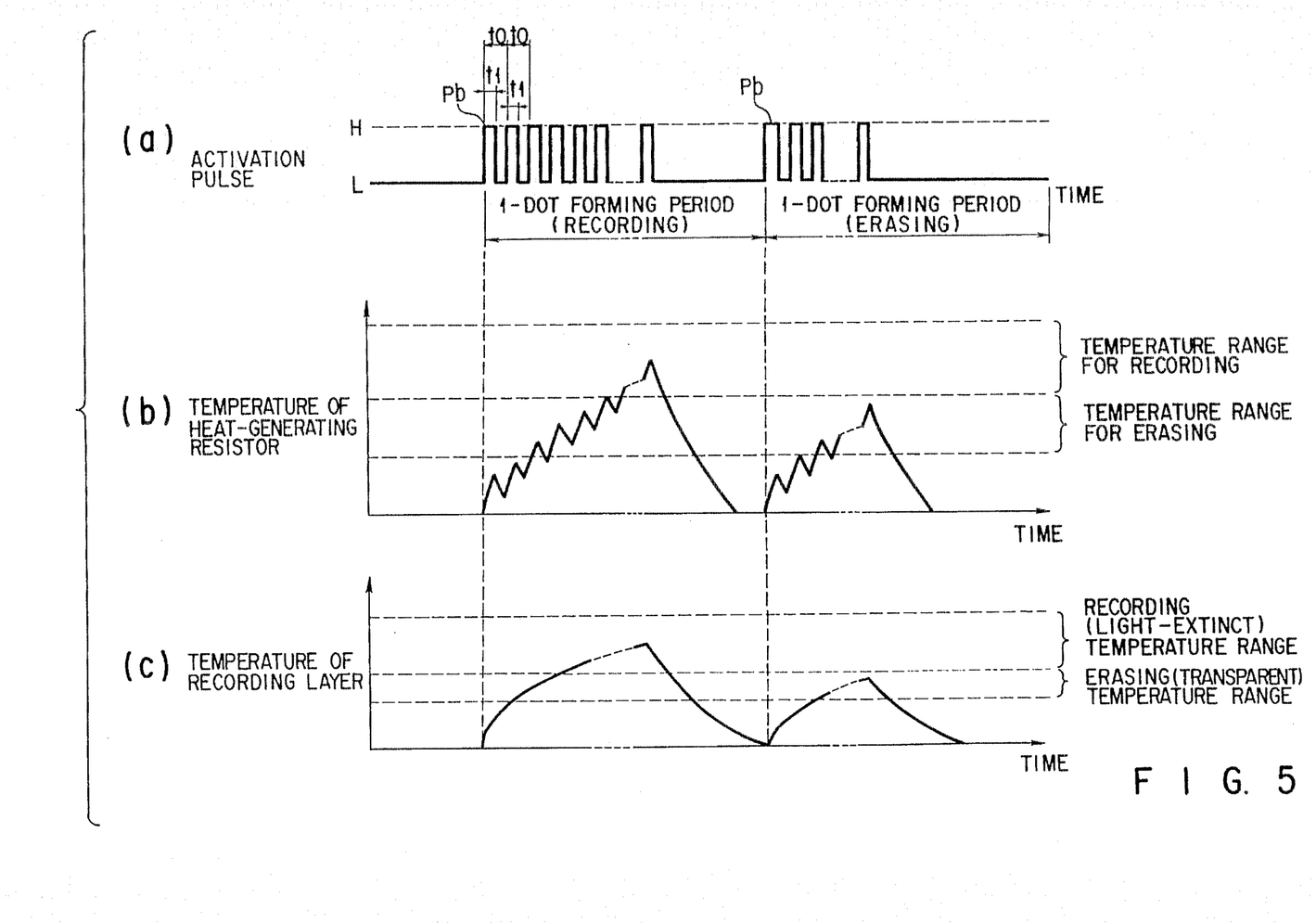
FIG. 5 is a diagram for explaining a schematic recording system employed in a recording apparatus of the present invention.

The activation pulse computing section 43 determines data for generating the activation pulse to be supplied the heat-generating resistor array 31 as shown in (a) in FIG. 5 from the image data received from the shift register 41 and the result of the discrimination in the mark/space discriminating section 42.

The determined activation pulse data is decoded by the decoder 46 to be a train of pulses, and this pulse train is then output to the driver 47.

The heat-generating resistor array 31 has a plurality of heat-generating resistors (not shown) arranged in a row in a direction perpendicular to the recording direction for the display portion 20. A Heat-generating resistor is provided in correspondence to a dot or pixel of an image. In this case, the number of heat-generating resistors provided is sufficient to record information along the entire width (the aforementioned perpendicular direction) of the display portion 20.

The thermal recording operation for the apparatus of the present invention will be described below.

FIG. 5 presents an exemplary illustration of the relationship between the activation pulse train (a) for driving a heat-generating resistor corresponding to each dot based on image data, the temperature (b) of the heat-generating resistor that generates heat upon reception of the activation pulses, and the temperature (c) of the thermal recording layer 28 that rises by the heat from the heat-generating resistor.

The activation pulse consist of a number of unit pulse Pb, as shown in (a) in FIG. 5. A high-level (H) (active level) signal and a low-level (L) signal are alternately supplied at constant timing. In this example, the first train of the activation pulses (1-dot forming period) is for recording information, and the second (1-dot forming period) for erasing information.

According to this embodiment, an activation time for information recording and erasing is controlled by altering the number of unit pulse Pb each having a constant activation period and a constant duty ratio. For instance, for information recording (rendering the layer 28 opaque), electric power is supplied to the heat-generating resistors by that number of unit pulses Pb which causes the temperature of the recording layer 28 to enter the recording temperature range (T2 of FIG. 3). To effect information erasing (rendering the layer 28 transparent), electric power is supplied to the heat-generating resistors by that number of unit pulses Pb which causes the temperature of the recording layer 28 to enter a erasing (transparent) temperature range (T1 of FIG. 3).

Assume that the density of the heat-generating resistors in the heat-generating resistors array 31 is 8 dots/mm (200 dpi), the mean resistance of the heat-generating resistors is 590 ohms, and the drive voltage in this case is 12 V. Let us now consider the case where, under these conditions, the period for forming one dot is 3.13 ms, the activation period of unit pulse t0 is 0.08 ms, and the ON duration t1 (high level period) is 0.06 ms. In this case, for recording a dot, electric power is supplied to the corresponding heat-generating resistor by 31 unit pulses, for example. For erasing a dot, electric power is supplied to the corresponding heat-generating resistor by 15 unit pulses, for example.

In this manner, the number of activation pulses (activation time is to sum up the number of unit pulses Pb activation time) to the individual heat-generating resistors is determined by the activation pulse computation section 43 in such a way that the heat-generating resistors are heated at different temperatures for mark (opaque) dots and space (transparent) dots to cause the aforementioned status changes shown in FIG. 3 on the recording layer 28.

When the recording or erasing energy (electric energy) which is divided as multiple pulses is supplied to the heat-generating resistors, the temperature profile of the heat-generating resistor will have a saw-tooth shape as shown in (b) in FIG. 5 due to the balance of the heat accumulation and heat radiation in the vicinity of the heat-generating resistor. The temperature profile of the recording layer 28 will not have sharp edging portions because of overlapping the heat during the heat conducting to the recording layer 28 and draw a gentle rising curve as shown in (c) in FIG. 5.

Conventional thermal recording materials, such as thermal recording paper and thermal transfer recording ribbon, can record information when heated to or above a threshold temperature beyond which a status change, such as coloring or softening, melting or sublimation, will occur. In contrast, the recording material for use in the present invention is characterized in its two threshold temperatures for information erasing and recording, thus requiring three-levels control of the temperature.

In recording information (displaying a visible image), regardless of an existence of an old image which is previous recorded image, the heat-generating resistor associated with target pixel corresponding to a mark dot has only to be heated up to a temperature at which the temperature of the recording layer 28 rises to an opaque range, so that the activation of the heat-generating resistor is so controlled as to supply power by that number of unit pulse Pb which will cause that temperature rise. In erasing information, regardless of an existence of an old image, the heat-generating resistor associated with target pixel corresponding to a space dot has only to be heated up to a temperature at which the temperature of the recording layer 28 rises to a transparent range, so that the activation of the heat-generating resistor is so controlled as to execute power supply by that number of unit pulse Pb which will cause that temperature rise. This control can ensure easy and stable overwrite recording (to be described later) to form a new image while erasing an old image.

The recording layer 28 used in this embodiment is made of a recording material which will become transparent at a temperature range between about 60° C. to 100° C., and will have light extinction saturated at a temperature of about 105° C. or above.

The upper limit of the heating temperature is determined by the heat resistance of the protection layer 29 or recording layer 28, and is about 150° C. for this card 10 in the embodiment.

According to the recording system employed in this apparatus, the temperature of the heat-generating resistors gradually rises while repeating the rise/fall fluctuation in accordance with the ON/OFF (High/Low) state of the activation pulse. Accordingly, the slope of the envelope of the peak temperature in the temperature change of the heat-generating resistors becomes gentle. The light-extinct (opaque) state or transparent state of the recording layer 28 is determined by the final temperature reached. This provides such an advantage that the time for the temperature of the recording layer 28 to lie in the recording/erasing temperature range can be made longer by the gentle temperature gradation.

In the case of controlling the temperature through accumulated-heat control or the like too, the gentler the temperature rise near the peak temperature, the smaller the temperature change per unit time becomes. This can ensure fine temperature control, and is very advantageous particularly in information erasing that occurs in a relatively narrow temperature range.

The activation pulse (unit pulse) is not limited to the type which is intermittently supplied at constant timing, but may be supplied intermittently at irregular timings in a period where one dot is formed.

Figure 6:
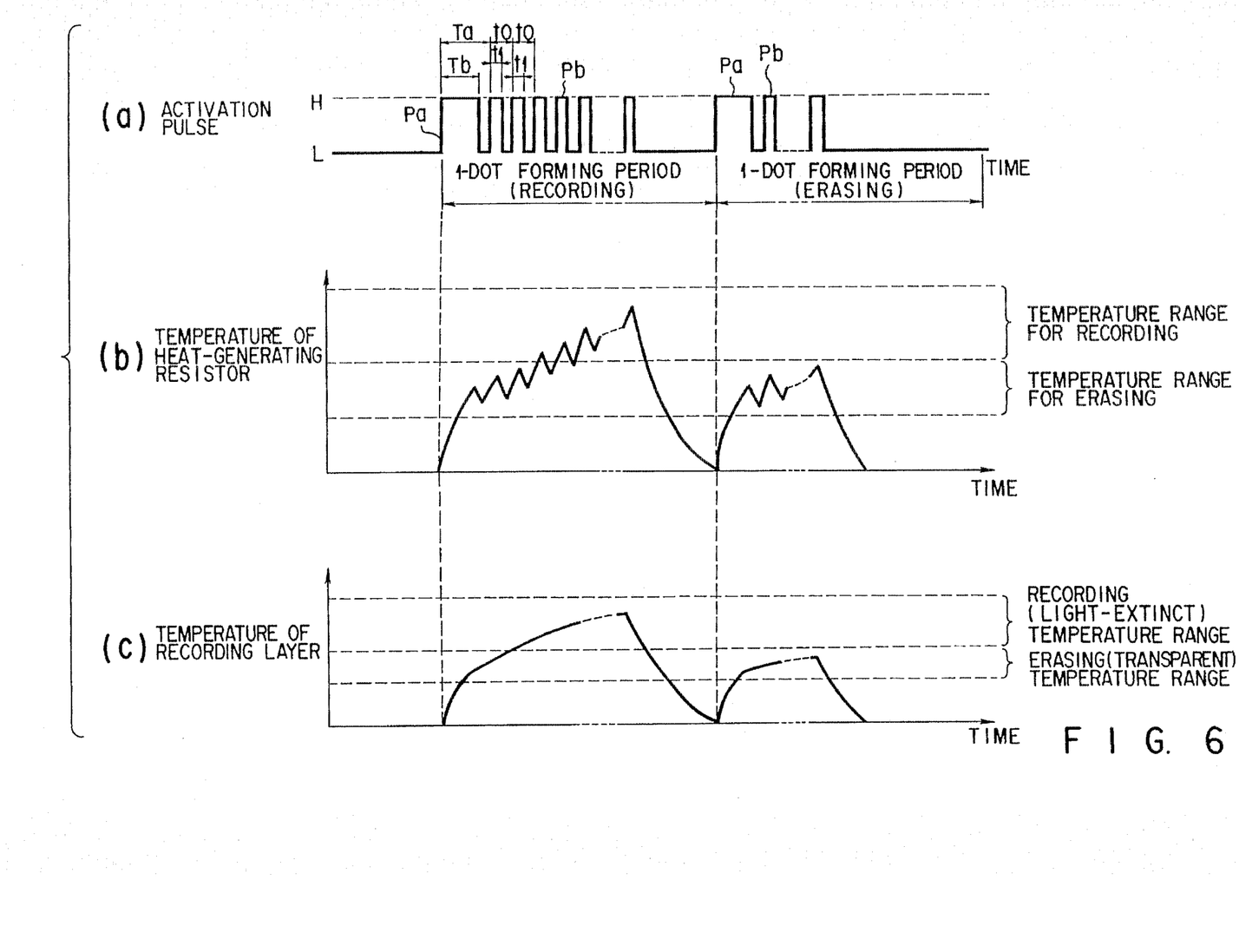
FIG. 6 is a diagram for explaining a first modification of the recording system in the recording apparatus of the present invention.

FIG. 6 exemplifies the case where the energy to be given at first in the one-dot forming period is made larger than the other energy given in the remaining of the one-dot forming period, irrespective of information recording/erasing.

In other words, as shown in (a) in FIG. 6, the ON duration Tb of the first pulse Pa is set longer than that t1 of the unit pulses Pb following the first pulse Pa. In this case too, the entire activation time is controlled by altering the number of unit pulses Pb which follows the first pulse Pa. The pulse Pb has a constant activation period to and a constant duty ratio.

Let us now consider the case of FIG. 6 where, under the above conditions, the period for forming one dot is 3.13 ms, the entire width Ta of the first pulse Pa is 0.6 ms, the ON duration Tb of this pulse is 0.45 ms, the period t0 of the unit pulse Pb following the first pulse is 0.07 ms, and the ON duration t1 of this pulse Pb is 0.06 ms. In this case, for recording a dot, power has only to be supplied to the corresponding heat-generating resistor by the first pulse Pa and 23 unit pulses, for example. For erasing a dot, power has only to be supplied to the corresponding heat-generating resistor by the first pulse Pa and 8 unit pulses, for example.

The temperature rise of the heat-generating resistors can be quickened by supplying the first pulse Pa set longer than the unit pulse Pb in the above manner. This quickens the temperature rise to the range of recording/erasing temperature. And ensures gentler temperature gradation among that recording/erasing temperature range. Like in the case of the above-described embodiment shown in FIG. 5, the time for the temperature of the recording layer 28 to lie in the recording/erasing temperature range can be made longer, thus ensuring fine temperature control even in the case the control is carried out through accumulated-heat control or the like.

Figure 7:
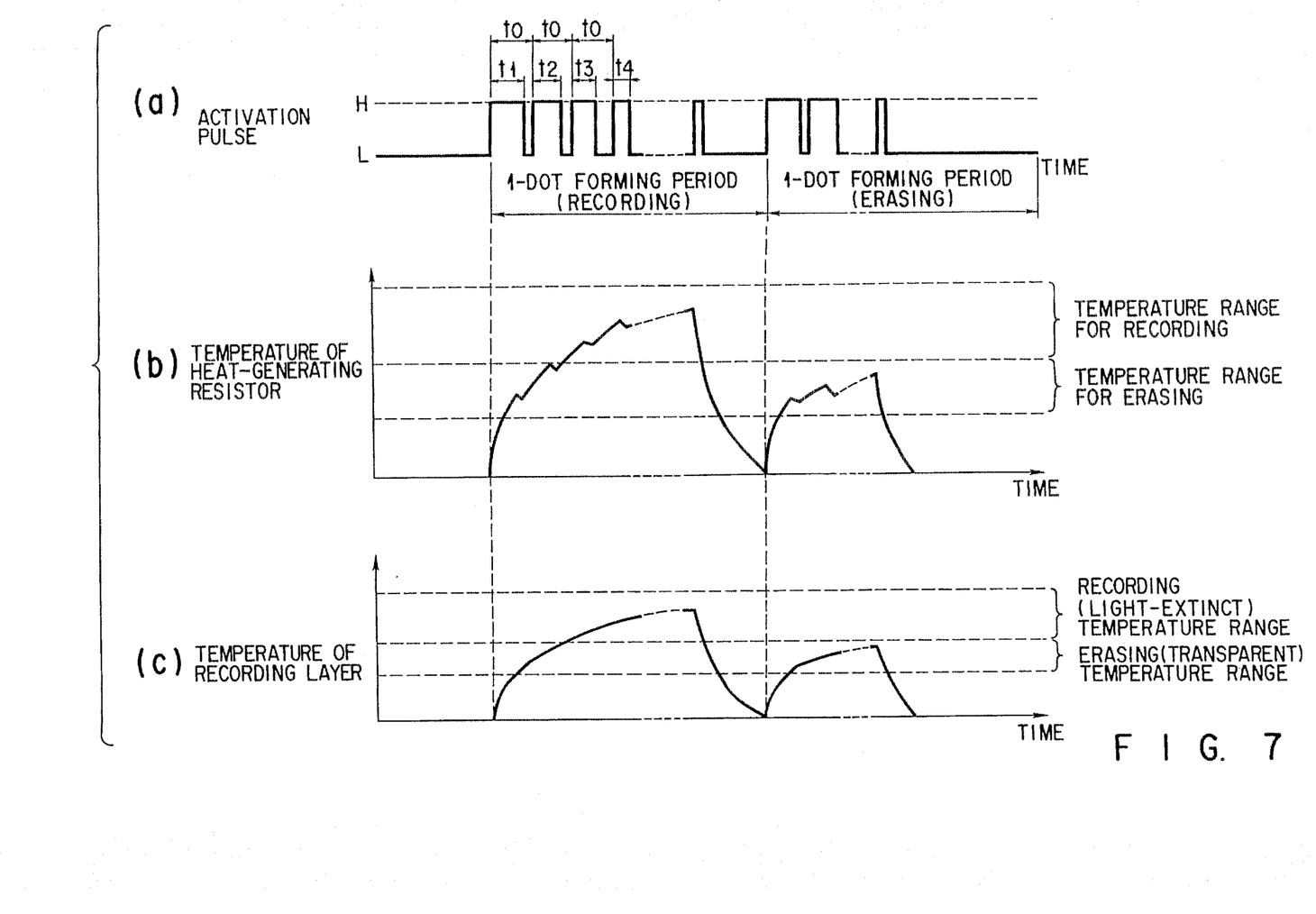
FIG. 7 is a diagram for explaining a second modification of the recording system in the recording apparatus of the present invention.

Alternatively, as shown in (a) in FIG. 7, the duty ratio of the activation pulses may be controlled to vary gradually. In this case the entire activation time is controlled by changing the number of pulses with the same pulse period to but different duty ratios.

Let us now consider the case of FIG. 7 where, under the above conditions, the period for forming one dot is 3.13 ms, the period t0 of the individual pulses is 0.8 ms, the ON durations t1, t2, t3 . . . of those pulses is gradually shortened from 0.06 ms (t1) to 0.005 ms. In this case, for recording dots, power has only to be supplied to the heat-generating resistors by 37 pulses, for example. For erasing dots, power has only to be supplied to the heat-generating resistors by 16 pulses, for example.

In this case of FIG. 7 too, as per the above-described cases of FIGS. 5 and 6, the time for the temperature of the recording layer 28 to lie in the recording/erasing temperature range can be made longer, thus ensuring fine temperature control even in the case the control is executed through accumulated-heat control or the like.

In the above-described embodiments, the activation time of the heat-generating resistors is simply separated into two, one for recording and the other for erasing, in order to set the temperature of the recording layer 28 to an opaque temperature range and a transparent temperature range. In the case of thermal recording with a thermal head, however, it is known that the heat-generating resistors may actually have different temperature profiles due to the accumulated heat of the thermal head, heating hysteresis or the environmental conditions, in spite of the same activation time.

In the recording system in the recording apparatus embodying the present invention, it is important to apply such thermal energy as to set the temperature of the recording layer 28 to the opaque temperature range or the transparent temperature range irrespective of the accumulated heat of the thermal head, heating hysteresis or the environmental conditions. That is, the temperature of the recording layer 28 can accurately be raised to a predetermined temperature range by controlling the applied electric energy in light of those factors.

According to the embodiment shown in FIG. 4, therefore, the thermal head recording means 13 is provided with the data updating section 44 and line buffer 45, constituting the activation pulse data computing circuit, which performs compensation operations.

The control operation using the activation pulse data computing circuit will be described below referring to FIG. 4 again.

The activation pulse data computing circuit makes an image a bit map, and estimates the accumulated heat of the thermal head and the heating hysteresis of the heat-generating resistors of the thermal head from pixel data around target pixel data (mark dot/space dot). The activation pulse data computing circuit controls the activation pulse to the heat-generating resistor corresponding to the position of the target pixel. This function will be discussed specifically below.

The line buffer 45, one element of the activation pulse data computing circuit, stores data of four lines of present and preceding image data. The data from the line buffer 45 is output to the aforementioned activation pulse computing section 43 and the data updating section 44.

The data updating section 44 also constituting the activation pulse data computing circuit receives new data (for one line) from the shift register 41 and new add the same to the data from the line buffer 45 and deletes the oldest data (for one line), thereby updating data. The contents of the line buffer 45 are rewritten with this renewed data.

The shift register 41 has a function to convert input serial image data into parallel data and extract or cut out data of the target pixel and data of the pixels around it in accordance with a given matrix size. Accordingly, the shift register 41 outputs the data of a matrix to the mark/space discriminating section 42, the activation pulse computing section 43 and the data updating section 44.

Figure 8:
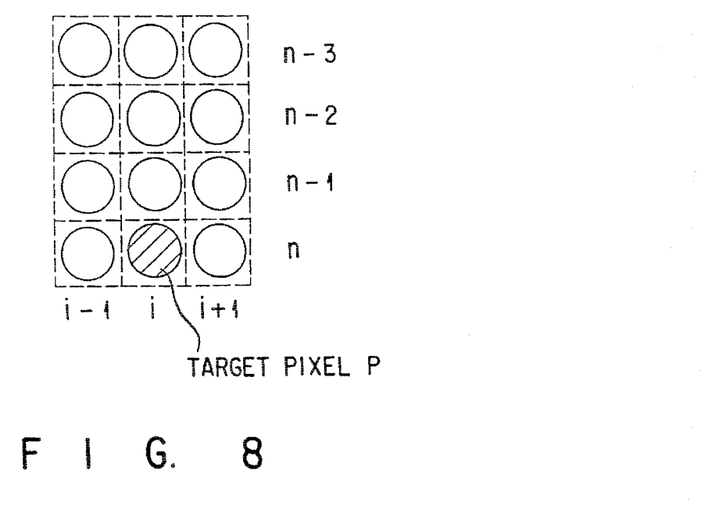
FIG. 8 is a diagram exemplifying a reference area matrix to be used for estimating accumulated heat energy of heat-generating resistors corresponding to a target pixel.

FIG. 8 exemplifies a reference area matrix representing the relationship between a target pixel P and pixels around the target pixel P.

The matrix of FIG. 8 has a size of 3 dots by 4 dots, and is used to determine input energy to the heat-generating resistor for the target pixel P in line n referring to, for example, two single dots i−1 and i+1 in line n adjoining the target pixel P and the preceding energy applying history (for three lines n−3, n−2, n−1).

The activation pulse computing section 43 is provided with a table to store the relationship between input energy to each heat-generating resistor and a train of activation pulses (number and duration) estimating the accumulated heat energy in the heat-generating resistor corresponding to the target pixel, from the positional relationship between the mark dots and space dots around the target pixel in the matrix and the ratio of numbers of those dots.

That is, in the table is stored data of different numbers of activation pulses to be applied to the heat-generating resistors which are determined according to the computed amount of input energy. For instance, when it is judged from preceding pixel data and pixel data thereabout that there is no influence of the accumulated energy for the heat-generating resistor corresponding to the target pixel, activation pulse data to set the number of pulses to be applied to that heat-generating resistor to a predetermined number of pulses is read out from the table. When the accumulated energy is judged as higher than the normal level, however, activation pulse data to set the number of pulses lower than the predetermined number of pulses is read out from the table. As a predetermined relationship between the input energy and the activation pulse is made into a table in the above manner, actual activation pulse data can easily be determined referring to this table.

The feature of this recording system in the recording apparatus lies in supplying electric power not only to the heat-generating resistors corresponding to mark dots to form an image but also to the heat-generating resistors corresponding to space dots which do not form an image. In this respect the activation pulse computing section 43 is provided with a table 43a for mark dots and a table 43b for space dots.

The number of activation pulses is compensated in accordance with different accumulated energies in the individual heat-generating resistors in the above manner. Regardless of an image pattern, therefore, the temperature of the recording layer 28 of the card 10 can properly be set to the opaque temperature range for mark dots or to the transparent temperature range for space dots as shown in FIGS. 5 to 7.

A description will now be given of how information is recorded on the display portion 20 of the card 10 (formation of a visible image) and it is erased.

Figure 9:
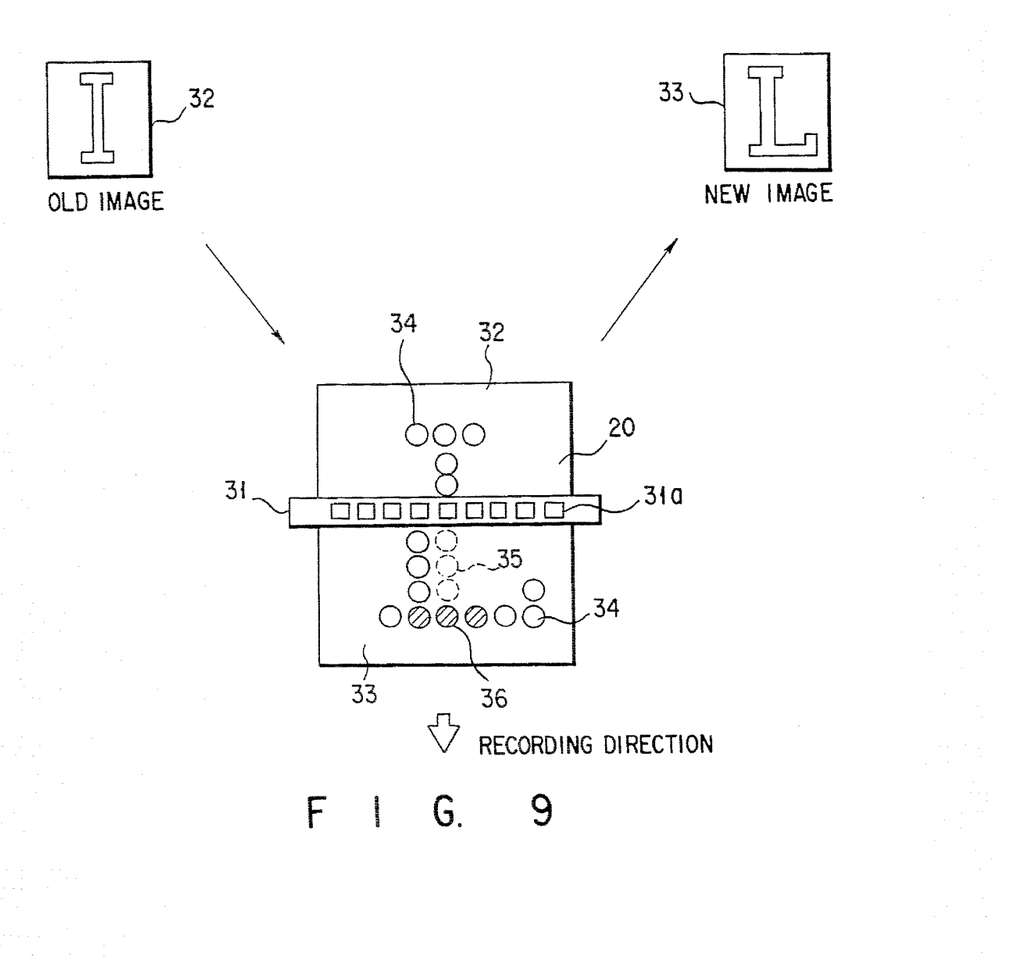
FIG. 9 is a diagram for explaining recording and erasing operations of the embodiment of the invention.

FIG. 9 illustrates the case where an alphabet letter "I" is erased and a letter "L" is recorded, or the image of "L" is written over the image of "I" (i.e., overwrite recording).

In FIG. 9, reference numeral "31" denotes a array of heat-generating resistor 31a, which are part of the thermal head recording means 13, reference numeral "32" is old information (old image) previously written on the display portion 20, and reference numeral "33" is a new image currently written.

In this example, the individual heat-generating resistors of the heat-generating resistor array 31 are heated by the above-described recording system while the card 10 is conveyed under the fixed heat-generating resistor array 31 in the recording direction as indicated by the arrow. This can accomplish the overwrite recording to erase the old image "I" 32 while recording the new image "L" 33.

In FIG. 9, solid-line circles 34 show recording pixels (mark dots), and broken-line circles 35 erased pixels (space dots) that are part of the old image 32. Shaded solid-line circles 36 show recording pixels (mark dots) that have been recorded again as part of the new image 33.

In this case, a plurality of activation pulses intermitted at constant timings are supplied to the heat-generating resistors provided in accordance with pixels in one-dot forming period, for example. For instance, the number of activation pulses supplied to a heat-generating resistor to be activated is controlled, as described above, in accordance with accumulated heat energy estimated from data prepared with respect to preceding and around the target pixel. The maximum number of pulsed supplied to the heat-generating resistor is 31. In the similar manner, the number of pulses to be supplied to a heat-generating resistor corresponding to a pixel to be erased is controlled in accordance with accumulated heat energy estimated from data prepared with respect to preceding and around the target pixel. The maximum number of pulses supplied to the heat-generating resistor corresponding to the target pixel is set 15.

The gradation of the temperature rise of the recording layer 28 can be made gentler as described earlier by applying power in the form of divided pulses to the heat-generating resistors. The gentle gradation temperature curve reduces a temperature change per unit time, thus ensuring finer control. It is therefore easy to perform temperature control for information erasing that occurs in a relatively narrow temperature range, achieving a stable operation.

As information recording and erasing can be done by a single thermal head, the recording apparatus can be designed compact and the processing time can be shortened.

Although the light-extinct or opaque state of the recording layer 28 is treated as a recording pixel (mark dot) in the above embodiment, this is not restrictive. The light-extinct state may be treated as the initial state (space dot) and the transparent state as a recording pixel.

The recording material is not limited to the one used in this embodiment, but a recording material having as a coloring source a leuco dye that causes a reversible color change by controlling the heat energy alone.

The present invention may be modified in various other manners within the scope and spirit of the invention.

What is claimed is:

1. A recording apparatus for recording pixels on a storage medium by displaying pixels thereon when heated to a first temperature range and permitting erasing of said pixels when heated to a second temperature range, said apparatus comprising:

thermal head means for applying thermal energy to said storage medium, said thermal head means including a plurality of heat-generating resisters and means for performing pixel recording and pixel erasing at the same time by applying thermal recording energy and thermal erasing energy, respectively to said storage medium;

determining means for determining electrical pulses, in a one-pixel recording period, having multiple active-level signals for causing said plurality of heat-generating resistors to supply thermal energy to said storage medium in accordance with a pixel which is an on-mode signal or an off-mode signal; and drive means for driving said plurality of heat-generating resistors based on said electrical pulses so as to change the temperature of said storage medium to said first temperature range when a pixel to be recorded is said on-mode signal and to change the temperature of said storage medium to said second temperature range when said pixel to be recorded is said off-mode signal; and wherein said determining means includes means for producing said electrical pulses whose active level signals have pulse widths that become sequentially shorter.

2. A recording apparatus for recording pixels on a storage medium by displaying pixels thereon when heated to a first temperature range and permitting erasing of said pixels when heated to a second temperature range, said apparatus comprising:

thermal head means having a plurality of heat-generating resistors for applying heat to said storage medium;

determining means for determining electrical pulses, in a one-pixel recording period, having multiple active-level signals for causing said plurality of heat-generating resistors to supply heat to said storage medium in accordance with a pixel which is an on-mode signal or an off-mode signal, said determining means including means for producing said electrical pulses whose active-level signals have pulse widths which become sequentially shorter; and drive means for driving said plurality of heat-generating resistors based on said electrical pulses so as to change the temperature of said storage medium to said first temperature range when a pixel to be recorded is said on-mode signal and to change the temperature of said storage medium to said second temperature range when said pixel to be recorded is said off-mode signal.

\* \* \* \* \*